UNITED STATES PATENT OFFICE.

MAX H. ISLER, OF MANNHEIM, GERMANY, ASSIGNOR TO THE BADISCHE ANILIN AND SODA FABRIK, OF LUDWIGSHAFEN, GERMANY.

MORDANT-DYEING RED COLOR AND PROCESS OF MAKING SAME.

SPECIFICATION forming part of Letters Patent No. 650,756, dated May 29, 1900.

Application filed February 18, 1899. Serial No. 706,014. (Specimens.)

*To all whom it may concern:*

Be it known that I, MAX H. ISLER, a citizen of the Swiss Republic, residing at Mannheim, in the Grand Duchy of Baden and Empire of Germany, have invented new and useful Improvements in the Manufacture of Mordant-Dyeing Coloring-Matters, (for which patents have been obtained in Germany, No. B. 23,259, dated August 22, 1898; in England, No. 25,651, dated December 5, 1898, and in France, No. 270,597, dated November 5, 1898,) of which the following is a specification.

In Letters Patent, No. 617,686 I have described the production of mordant-dyeing coloring-matters from dinitro-anthraquinone bodies by treatment thereof with fuming sulfuric acid in the presence of both sulfur and boracic acid simultaneously. I have there described that according to the conditions observed when effecting this process either a comparatively-insoluble coloring-matter or a coloring-matter possessing the character of a sulfoacid and soluble in cold water is produced.

The present invention consists in the manufacture of a mordant-dyeing coloring-matter which is comparatively insoluble in water from the said sulfoacid soluble in cold water, described in my said Letters Patent No. 617,686.

In order to produce my new coloring-matter in accordance with the present invention, I treat it with sulfuric acid of a high degree of strength at a high temperature.

The following example will serve to illustrate the manner in which my invention can best be carried into practical effect. The parts are by weight.

Example: Prepare a coloring-matter melt according to example 2 of my said Letters Patent No. 617,686—that is to say, by mixing together about ten parts dinitro-anthraquinone, ten parts crystallized boracic acid, two parts of sulfur, and two hundred parts of fuming sulfuric acid containing about forty-five per cent. free anhydride, ($SO_3$,) and heating this mixture for about two to two and a half hours at a temperature of 140° to 150° centigrade. Allow the melt to cool and add to it from five to six times its weight of a sulfuric acid containing about sixty-three per cent. $H_2SO_4$. Heat the mixture thus obtained for from one to two hours at a temperature of 130° to 140° centigrade. My new coloring-matter thus obtained can be collected in the usual way—that is, by pouring into ice-water, filtering, and washing till free from acid.

If desired, the soluble coloring-matter that is used as initial material in this invention can be isolated prior to treatment with the strong sulfuric acid; but the process according to the above example is simpler.

My new coloring-matter thus obtained has a percentage composition corresponding to that possessed by hexa-oxy-anthraquinones; but it differs in its properties from all the hexa-oxy-anthraquinones hitherto known in that it yields a red-violet solution in concentrated sulfuric acid and dyes cotton material that has been mordanted with alumina, giving red shades. It is insoluble in water and in hydrochloric acid and crystallizes in needles having a cantharides-green luster from nitro-benzene. It differs from its parent substance in being insoluble in water and when crystallized from nitro-benzene it contains neither nitrogen nor sulfur.

Now what I claim is—

1. The process for the production of new mordant-dyeing coloring-matter which consists in heating the soluble sulfoacid-like coloring-matter which can be obtained from a dinitro-anthraquinone by heating with sulfur, boracic acid and fuming sulfuric acid, with concentrated sulfuric acid until it is converted into a comparatively-insoluble mordant-dyeing coloring-matter, all substantially as described.

2. As a new article of manufacture the herein-described mordant-dyeing coloring-matter possessing the composition corresponding to a hexa-oxy-anthraquinone, which is soluble in nitro-benzene and crystallizes therefrom and which dyes alumina-mordanted cotton red shades.

In testimony whereof I have hereunto set my hand in the presence of two subscribing witnesses.

M. H. ISLER.

Witnesses:
ERNEST F. EHRHARDT,
PAUL JULIUS.